United States Patent [19]
Krause

[11] Patent Number: 5,028,184
[45] Date of Patent: Jul. 2, 1991

[54] REMOVABLY MOUNTED CARGO CONTAINER SECUREMENT DEVICE HAVING ADJUSTABLE BRACKETS

[76] Inventor: Theodore Krause, 203 Mariners Way, Copiague, N.Y. 11726

[21] Appl. No.: 456,480

[22] Filed: Dec. 26, 1989

[51] Int. Cl.$^5$ .............................................. B60P 7/15
[52] U.S. Cl. ................................. 410/143; 410/144; 410/151; 410/152
[58] Field of Search ............... 410/121, 126, 129, 130, 410/143, 144, 145, 146, 147, 148, 149, 150, 151, 152; 52/280, 283, 289, 702; 211/105.1, 105.3, 123; 248/357

[56] References Cited

U.S. PATENT DOCUMENTS

| | | | |
|---|---|---|---|
| 2,980,037 | 4/1961 | Elsner | 410/144 |
| 4,079,677 | 3/1978 | Vandergriff | 410/147 |
| 4,179,848 | 12/1979 | Gauron | 410/149 |

FOREIGN PATENT DOCUMENTS

| | | | |
|---|---|---|---|
| 957203 | 11/1974 | Canada | 410/144 |
| 1209255 | 10/1970 | United Kingdom | 410/144 |

Primary Examiner—Frank E. Werner
Assistant Examiner—Craig Slavin
Attorney, Agent, or Firm—Michael I. Kroll

[57] ABSTRACT

This invention relates to a container securement bracket. The bracket includes a beam assembly having a first end and a second end, a beam assembly pocket having a top, a bottom, and a back and receiving either of the first end or the second end of the beam assembly, an upper channel spacer securement disposed on the top of the beam assembly pocket, a lower channel spacer securement disposed on the bottom of the beam assembly pocket, an upper channel spacer disposed in the upper channel spacer securement, a lower channel spacer disposed in the lower channel spacer securement, and a projection disposed on the back of the beam assembly pocket and fitting into the recessed area in the sides of the container.

7 Claims, 2 Drawing Sheets

Truck, container on truck or container on ship

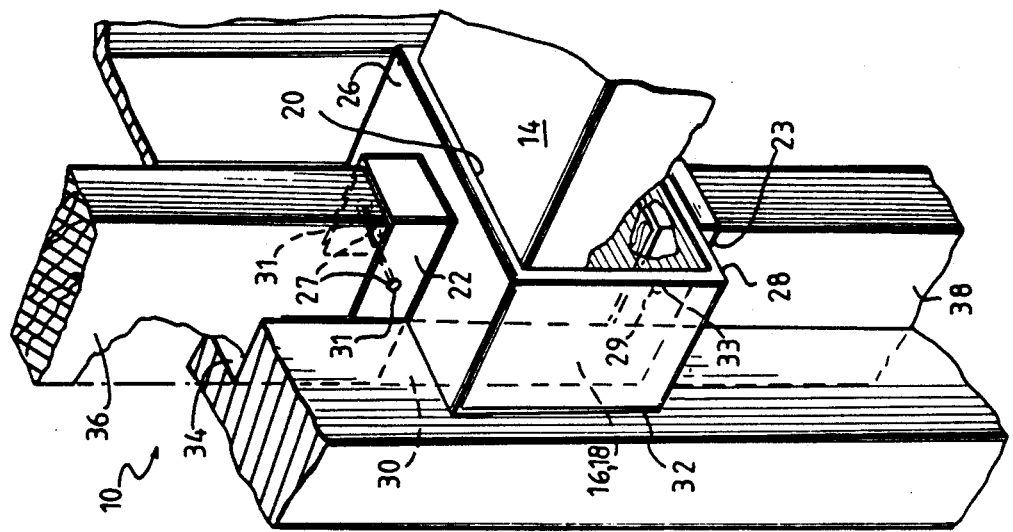
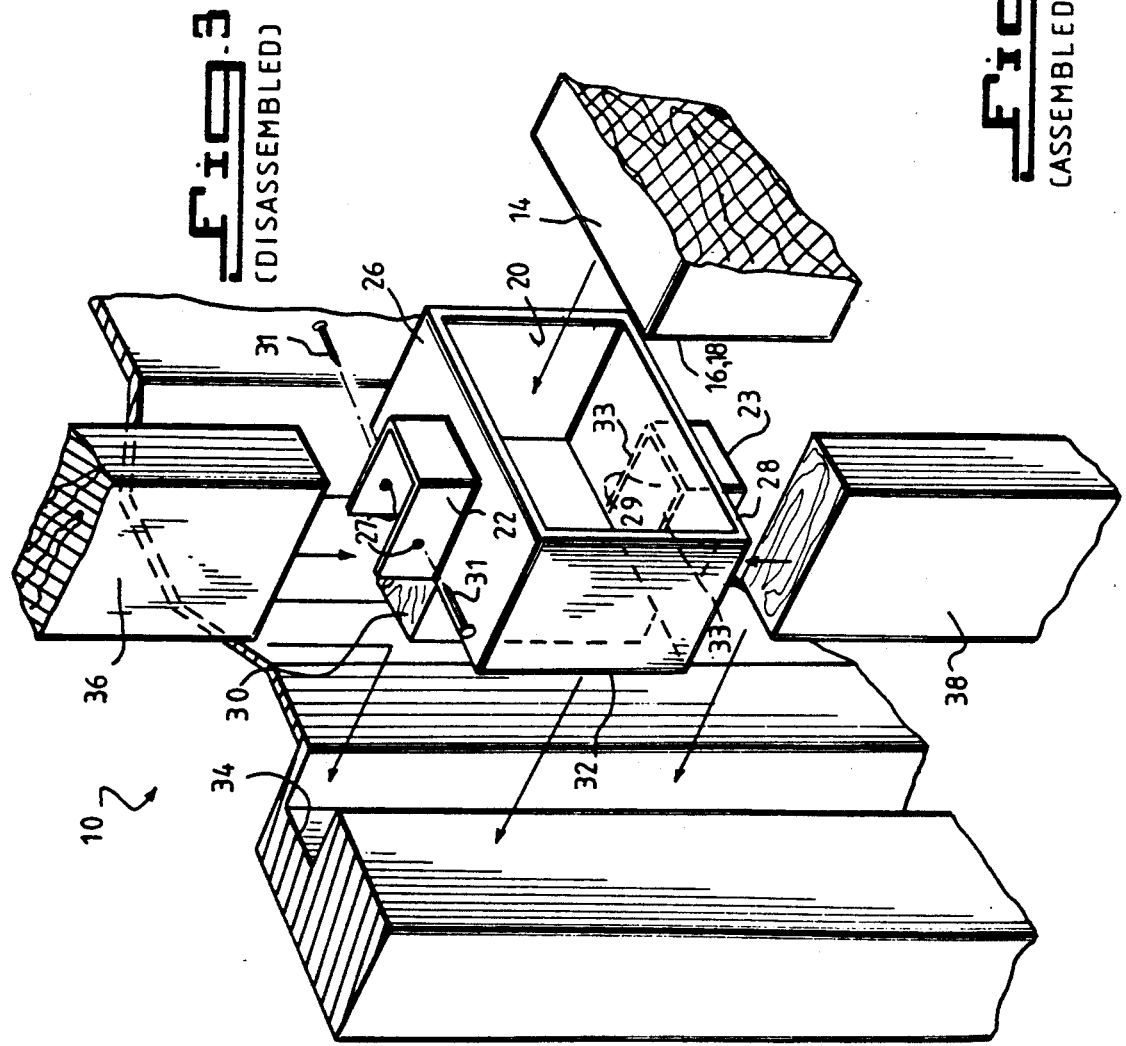

REMOVABLY MOUNTED CARGO CONTAINER SECUREMENT DEVICE HAVING ADJUSTABLE BRACKETS

BACKGROUND OF THE INVENTION

1. Field of the Invention

The present invention relates to a container securement device.

More particularly, the present invention relates to a removably mounted cargo container securement device having adjustable brackets.

2. Description of the Prior Art

Numerous innovations for cargo container securement devices have been provided in the prior art that are adapted to be used. Even though these innovations may be suitable for the specific individual purposes to Which they address, they Would not be suitable for the purposes of the present invention as heretofore described.

SUMMARY OF THE INVENTION

Accordingly, it is an object of tbe present invention to provide a container securement bracket that avoids the disadvantages of the prior art.

More particularly, it is an object of the present invention to provide an adjustable container securement bracket Which transfers the shear forces exerted onto the bracket or beam assembly to the solid square projection.

In keeping With these objects, and With others which will become apparent hereinafter, one feature of the present invention resides, briefly stated, in an adjustable container securement bracket, comprising, a beam assembly having a first end and a second end, a beam assembly pocket having a top, a bottom, a back, and receiving either of the first end or the second end of the beam assembly, an upper channel spacer securement disposed on the top of the beam assembly pocket, a lower channel spacer securement disposed on the bottom of the beam assembly pocket, an upper channel spacer disposed in the upper channel spacer securement, a lower channel spacer disposed in the lower channel spacer securement, and a projection disposed on the back of the beam assembly pocket and fitting into the recessed area in the rear of the container.

In accordance with another feature of the present invention, the beam assembly is made out of a material taken from the group of wood, steel, or composite.

Another feature of the present invention is that the upper channel spacer securement, the loWer channel spacer securement, and the beam assembly pocket are made out of a material taken from the group of metal or plastic.

Yet another feature of the present invention is that the projection is a solid.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 3 is an exploded perspective view of the container securement bracket of the present invention, shown disassembled; and FIG. 4 is a perspective view of the container securement bracket of the present invention, shown assembled.

LIST OF REFERENCE NUMERALS UTILIZED IN THE DRAWING

Figure 1:
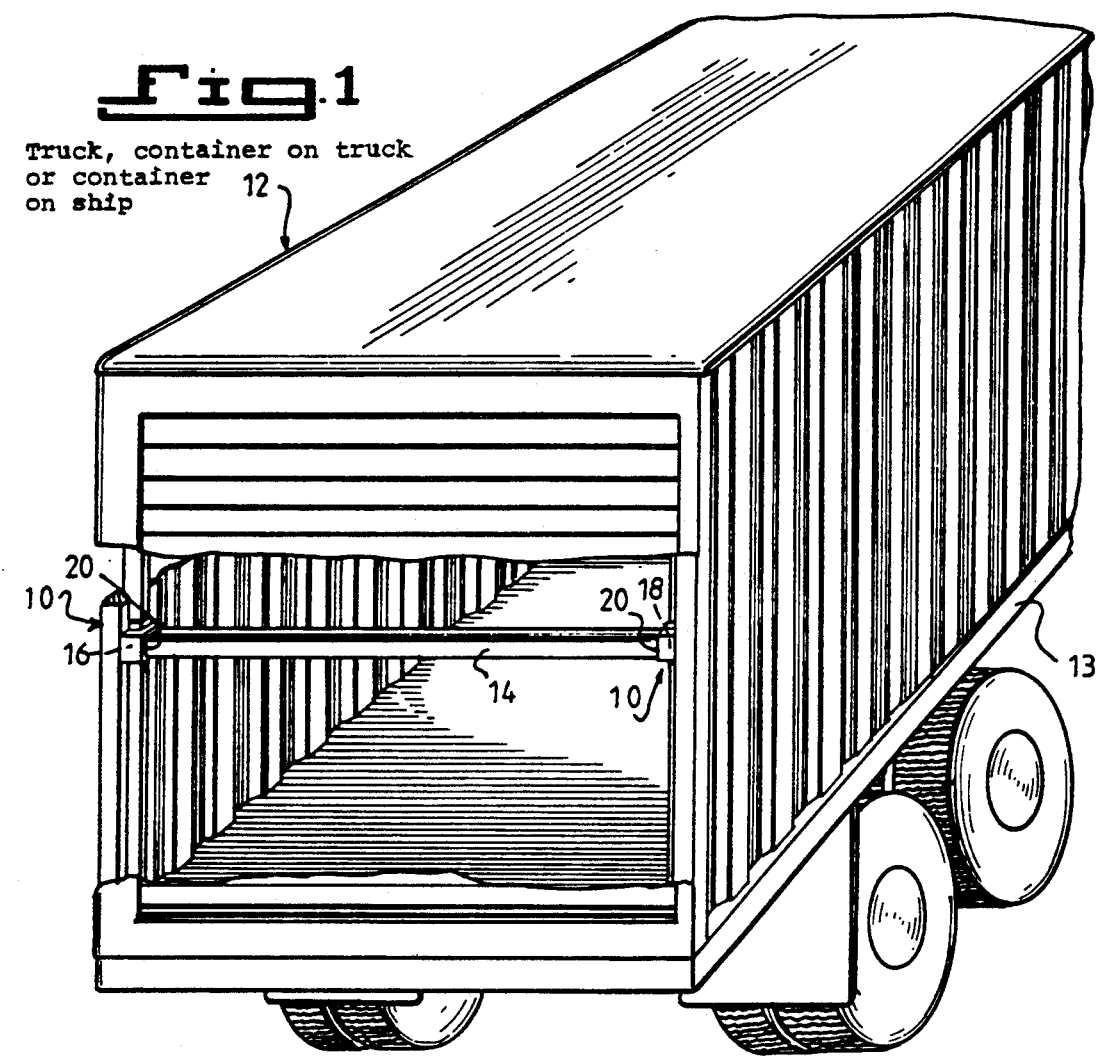
FIG. 1 is a perspective view of the container bracket of tbe present invention, being utilized on a container being transported by a truck and may also be a shipping container on a ship.
Figure 2:
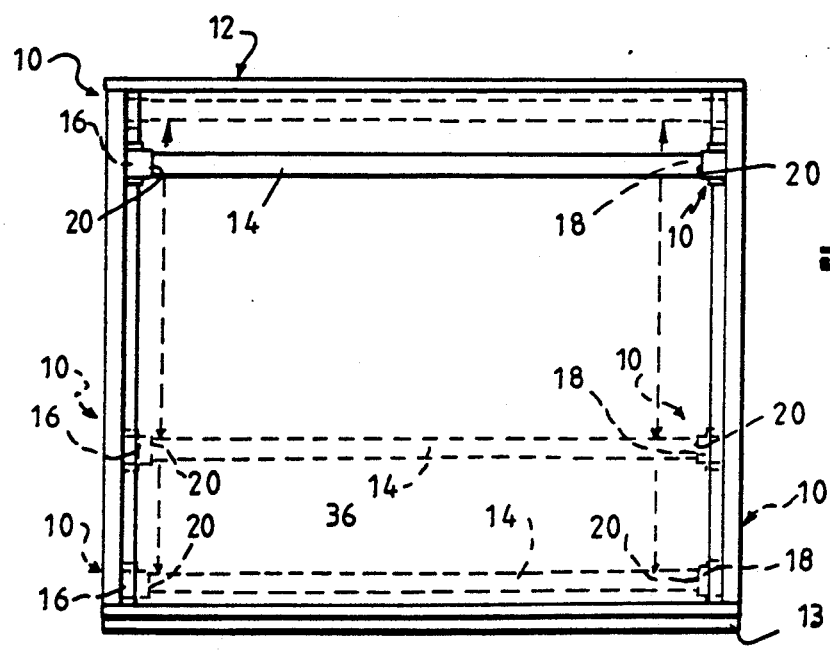
FIG. 2 is a front view of the container securement bracket of the present invention, adjustably securing the lading longitudinally.

10—adjustable container securement bracket of the present invention
12—container
13—flat bed
14—beam assembly
16—first end of the beam assembly 14
18—second end of the beam assembly 14
20—beam assembly pocket
22—upper channel spacer securement
23—lower channel spacer securement
26—top of the beam assembly 14
27—pair of holes for receiving nails 31
28—bottom of the beam assembly 14
29—pair of holes for receiving nails 33
30—solid projection
31—pair of nails
32—back of the beam assembly pocket 20
33—pair of nails
34—recessed area at the sides 37 of the container 12
36—upper channel spacer
37—sides of the container 12
38—lower channel spacer

DETAILED DESCRIPTION OF THE PREFERRED EMBODIMENT

Referring now to the FIGURES, where like numbers represent like parts of the adjustable container securement bracket of the present invention, shown generally at 10, mounted to a container 12, disposed on a flat bed 13 or a ship, while supporting a wooden, steel or composite beam assembly 14 The beam assembly 14 spans the width of the container 12, while securing the first end 16 and the second end 18 of the beam assembly 14 to the beam assembly pockets 20, contained in the adjustable container securement brackets 10 of the present invention.

The adjustable container securement bracket 10 of the present invention can be made of metal or of plastic.

The adjustable container securement bracket 10 of the present invention includes an upper channel spacer securement 22 and a lower channel spacer securement 23, affixed on the top 26 and the bottom 28 of the beam assembly pocket 20. The upper channel spacer securement 22 contains a pair of holes 27 for receiving a pair of nails 31. The lower channel spacer securement 23 contains a pair of holes 29 for receiving a pair of nails 33. Additionally, there is a solid projection 30 protruding from the hack 32 of the beam assembly pocket 20, that has a 1 ½ square cross-section.

The adjustable container securement bracket 10 of the present invention is used to secure lading, but only in the longitudinal direction. The solid projection 30, disposed on the back 32 of the beam assembly pocket 20 fits into recessed area 34 at the side 37 of the container 12.

It should be noted that all containers 12 have the feature of recessed areas 34 at the side 37 of the container 12 so that the adjustable container securement bracket 10 can be considered universal.

The wooden, steel or composite beam assembly 14 spans the two adjustable container securement brackets 10, that fit onto the first end 16 and the second end 18 of the beam assembly 14.

Forces that are exerted on the two adjustable container securement brackets 10, or on the beam assembly 14, are transferred to the solid square projection 30, in shear.

In the vertical orientation, the upper channel spacer 36 is received by the upper channel spacer securement 22 and is secured in place by nails 31. Likewise, the lower channel spacer 38 is received by the lower channel spacer securement 23 and is held in place by nails 33.

In other words, the solid projection 30 is slidably disposed in the recessed area 34 at the side 37 of the container 12.

The upper channel spacer 36 and the lower channel spacer 38 are secured to the beam assembly pocket 20 by the use of the upper channel spacer securement 22 and the lower channel spacer securement 23.

It will be understood that each of the elements described above, or two or more together, may also find a useful application in other types of constructions differing from the type described above.

While the invention has been illustrated and described as embodied in a removably mounted cargo container securement device having adjustable brackets, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In combination a container having a top, a bottom, sides and a rear, a pair of adjustable container securement brackets and a beam assembly having a first end and a second end, each adjustable container securement bracket of the pair of adjustable container securement brackets, comprising:
    a) a substantially hollow cube-like beam assembly pocket having a top, a bottom, and a back and receiving either of said first end or said second end of said beam assembly;
    b) an upper channel spacer securement disposed on said top of said beam assembly -pocket for receiving and holding substantially square members;
    c) a lower channel spacer securement disposed on said bottom of said beam assembly pocket for receiving and holding substantially square members;
    d) an upper channel spacer disposed in said upper channel spacer securement and extending to the top of the container;
    e) a lower channel spacer disposed in said lower channel spacer securement and extending to the bottom of the container so that along with said upper channel spacer a sufficient compressive force is exerted to hold said beam assembly pocket vertically in place, said beam assembly pocket and the beam assembly being held in place vertically by being pressure fitted between said lower channel spacer and said upper channel spacer by compressive forces of said lower channel spacer and said upper channel spacer, the bracket being placed by first loosely placing said lower channel spacer into place and then the upper channel spacer is placed loosely into place while the bracket is being placed between said loose upper channel spacer and said loose lower channel spacer so that said loose upper channel spacer and the bracket and the lower channel spacer form a unit that is firmly pushed into a recessed area in the sides of the container; and
    f) a projection disposed on said back of said beam assembly pocket and fitting into the recessed area in the sides of the container.

2. The combination as defined in claim 1, wherein the beam assembly is made out of.

3. The combination as defined in claim 2, wherein said upper channel spacer securement, said lower channel spacer securement and said beam assembly pocket are made out of metal.

4. The combination as defined in claim 3, wherein said projection is solid.

5. The combination as defined in claim 1, wherein the beam assembly is made out of steel.

6. The combination as defined in claim 1, wherein the beam assembly is made out of composite.

7. The combination as defined in claim 1, wherein said upper channel spacer securement, said lower channel spacer securement, and said beam assembly pocket are made out of plastic.

* * * * *